United States Patent [19]
Stone et al.

[11] Patent Number: 5,860,733
[45] Date of Patent: Jan. 19, 1999

[54] LIGHT FIXTURE WITH CONTROLLABLE LIGHT BLOCK

[75] Inventors: Thomas A. Stone, University Park; Joe P. Crookham, Oskaloosa; Dorothy K. DiSanto, Ottumwa, all of Iowa

[73] Assignee: Musco Corporation, Oskaloosa, Iowa

[21] Appl. No.: 423,268

[22] Filed: Apr. 17, 1995

[51] Int. Cl.⁶ .................................................. F21V 29/00
[52] U.S. Cl. .......................... 362/294; 262/282; 262/322; 262/345
[58] Field of Search ..................... 362/293, 294, 362/345, 373, 359, 322, 282, 298, 284

[56] References Cited

U.S. PATENT DOCUMENTS

| | | | |
|---|---|---|---|
| 998,501 | 7/1911 | Green | 362/359 |
| 1,104,245 | 7/1914 | Charlton . | |
| 1,166,244 | 12/1915 | Norton | 362/347 |
| 1,176,475 | 3/1916 | McPherson . | |
| 1,249,133 | 12/1917 | Lebby | 362/303 |
| 1,308,858 | 7/1919 | Norris . | |
| 1,397,803 | 11/1921 | Ensor et al. | 362/305 |
| 1,444,739 | 2/1923 | Geisendorfer et al. . | |
| 1,466,354 | 8/1923 | Drury | 362/298 |
| 1,560,408 | 11/1925 | Charlebois | 362/343 |
| 1,560,948 | 11/1925 | Smothers . | |
| 1,610,105 | 12/1926 | Moise | 362/298 |
| 1,639,753 | 8/1927 | Shelton | 362/282 |
| 1,660,067 | 2/1928 | Burtis | 362/298 |
| 1,691,209 | 11/1928 | Reynolds et al. | 362/255 |
| 1,715,578 | 6/1929 | Terry et al. . | |
| 1,751,111 | 3/1930 | Steele et al. | 362/298 |
| 1,876,138 | 7/1932 | Christmas | 362/298 |
| 1,926,675 | 9/1933 | Grunwald | 362/256 |
| 1,928,665 | 10/1933 | Irber | 362/256 |
| 1,990,666 | 2/1935 | O'loughlin | 362/256 |
| 1,998,967 | 4/1935 | Reynolds | 362/298 |
| 2,018,155 | 10/1935 | Shanahan | 362/256 |

(List continued on next page.)

FOREIGN PATENT DOCUMENTS

| | | | |
|---|---|---|---|
| 210185 | 1/1956 | Australia | 362/297 |
| 752722 | 2/1967 | Canada | 362/263 |
| 860671 | 12/1952 | Germany . | |
| d. 17440 | 12/1956 | Germany . | |
| 37 18577 A1 | 12/1988 | Germany . | |
| 0132375 | 10/1979 | Japan . | |
| 53058 | 3/1982 | Japan . | |

OTHER PUBLICATIONS

Sterner Lighting Systems Incorporated, Infranor Powerful Precision Arena Lighting, Copyright Notice 1995, 4 page Brochure, Winsted, Minnesota.

Athletic Business, Circle 102 Wide–Lite's F–Eclipse Arena Lighting Gives On/Off Flexibility, Dec. 17, 1994, p. 62.

Applying Arena Lighting System Guidelines in EC&M, Mar. 1995, pp. 76, and 81–85.

Primary Examiner—Y My Quach
Attorney, Agent, or Firm—Zarley, McKee, Thomte, Voorhees & Sease

[57] ABSTRACT

A lighting fixture with a controllable light block. The fixture includes a reflector and high intensity discharge lamp that requires a re-strike or warm-up period to come to full brightness or intensity. A cover member is mounted to the reflector and is moveable between an unblocked position and a blocked position. Movement of the cover member is immediate so that blockage of light from the fixture is immediately effectuated. The apparatus is configured so that cover member can be in the blocked position for indefinite periods of time even though the arc lamp continues to be operated at full power, without heat buildup which is detrimental to any part of the apparatus. The cover member also allows light control and special effects lighting options. Another aspect of the invention utilizes an aperture in the cover member that is alignable with the light source when the cover member is in the blocked position. Different inserts can be placed in the aperture, or it can be opened and closed independently to create special or theatrical effects including changes in color.

28 Claims, 7 Drawing Sheets

U.S. PATENT DOCUMENTS

| | | | |
|---|---|---|---|
| 2,221,629 | 11/1940 | Birdseye | 362/297 |
| 2,277,563 | 3/1942 | Scott et al. | 362/298 |
| 2,440,832 | 5/1948 | Pennybacker | 313/113 |
| 2,578,451 | 12/1951 | Rex | 362/297 |
| 2,826,710 | 3/1958 | Lipscomb | 313/117 |
| 2,904,710 | 9/1959 | Beenings et al. | 313/25 |
| 3,555,264 | 1/1971 | Schimmelpfennig . | |
| 3,624,386 | 11/1971 | Plumadore . | |
| 3,639,899 | 2/1972 | Ljungkull . | |
| 4,181,926 | 1/1980 | Kockott et al. | 362/294 |
| 4,261,029 | 4/1981 | Mousse | 362/298 |
| 4,338,655 | 7/1982 | Gulliksen | 362/298 |
| 4,351,018 | 9/1982 | Fratty | 362/298 |
| 4,423,471 | 12/1983 | Gordin et al. | 362/431 |
| 4,443,836 | 4/1984 | Horiuchi . | |
| 4,719,545 | 1/1988 | Cano | 362/373 |
| 4,725,934 | 2/1988 | Gordin | 362/298 |
| 4,760,499 | 7/1988 | Il . | |
| 4,796,169 | 1/1989 | Shemitz . | |
| 4,947,303 | 8/1990 | Gordin | 362/261 |
| 5,016,150 | 5/1991 | Gordin | 362/263 |
| 5,075,828 | 12/1991 | Gordin | 362/297 |
| 5,313,379 | 5/1994 | Lemons et al. . | |
| 5,383,101 | 1/1995 | Keranen . | |

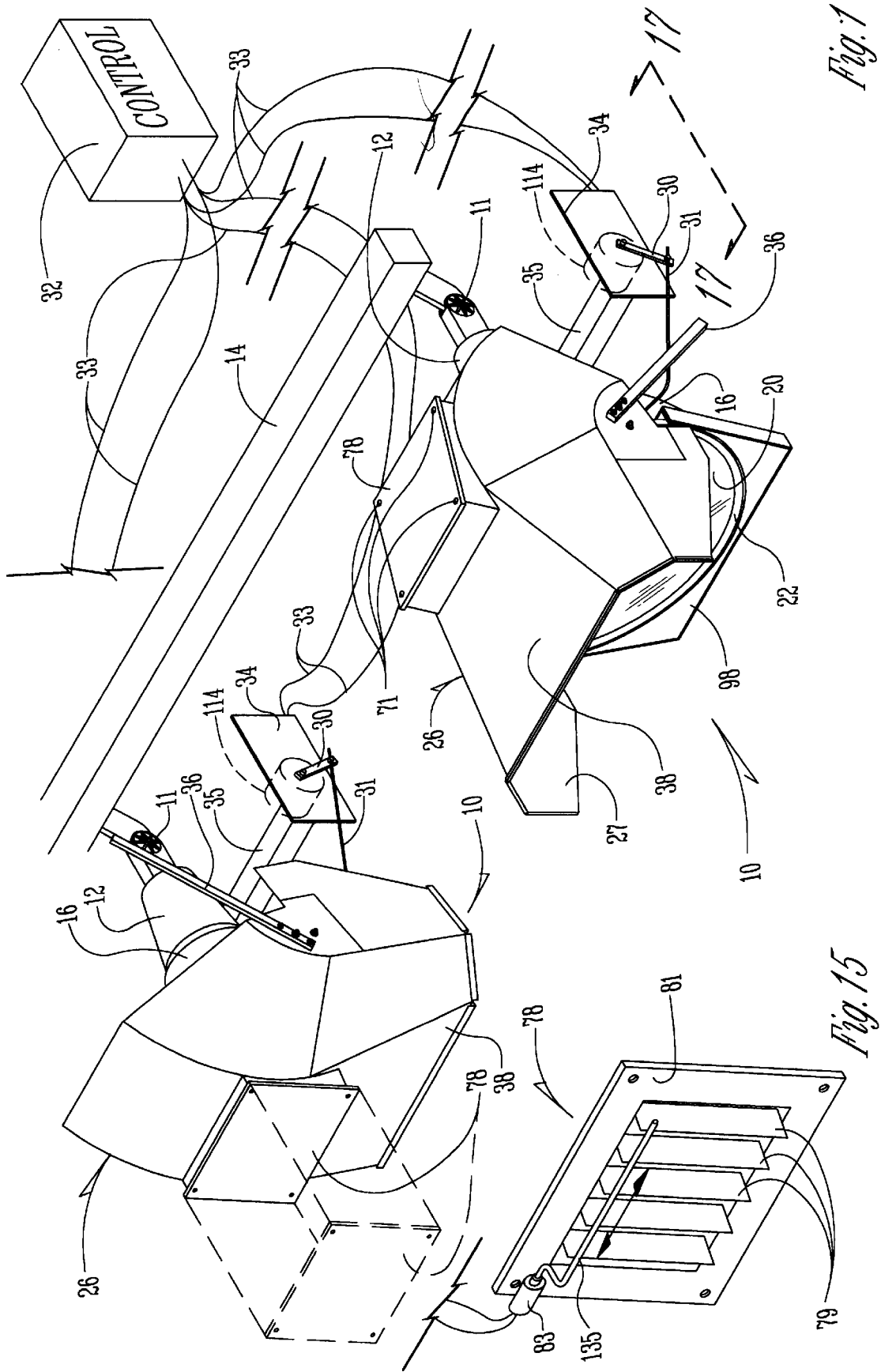

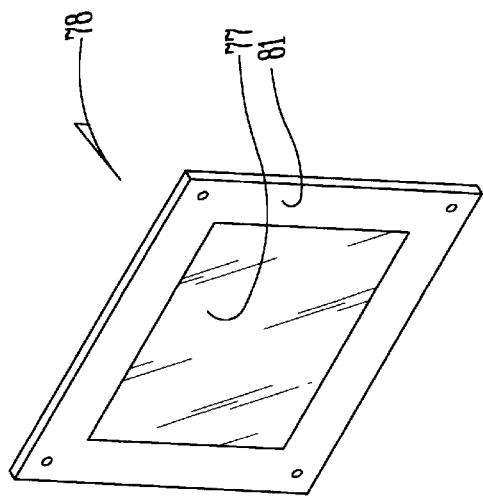
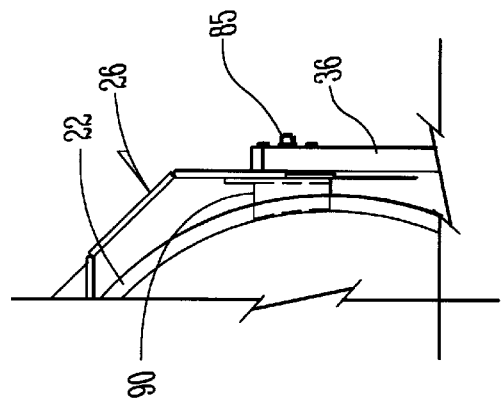
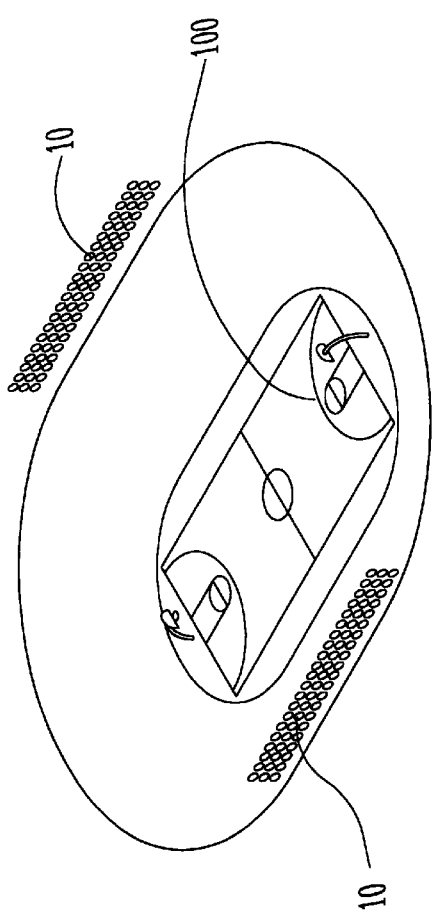
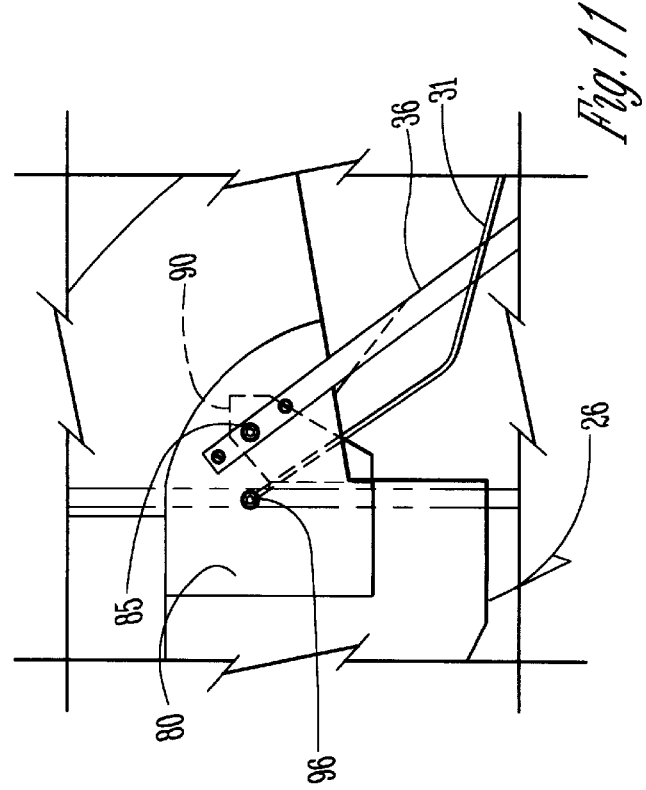

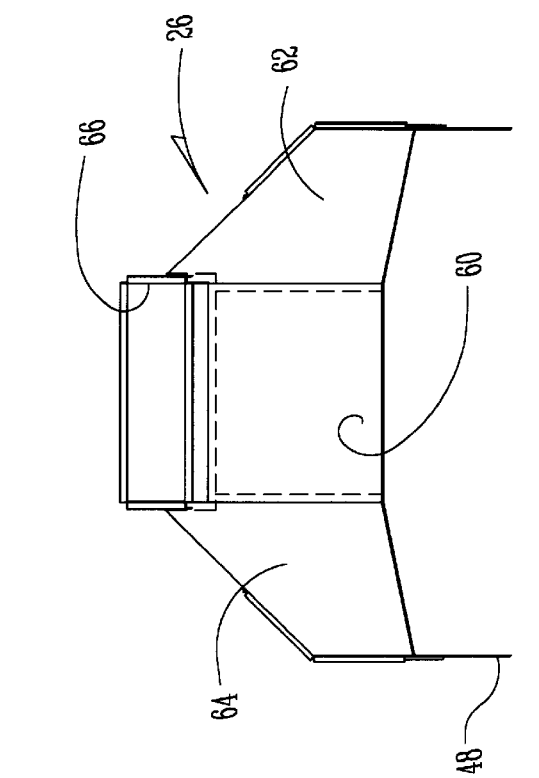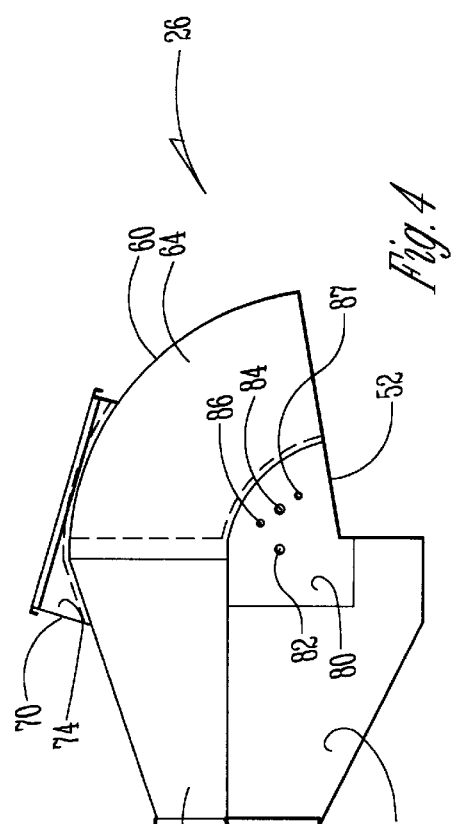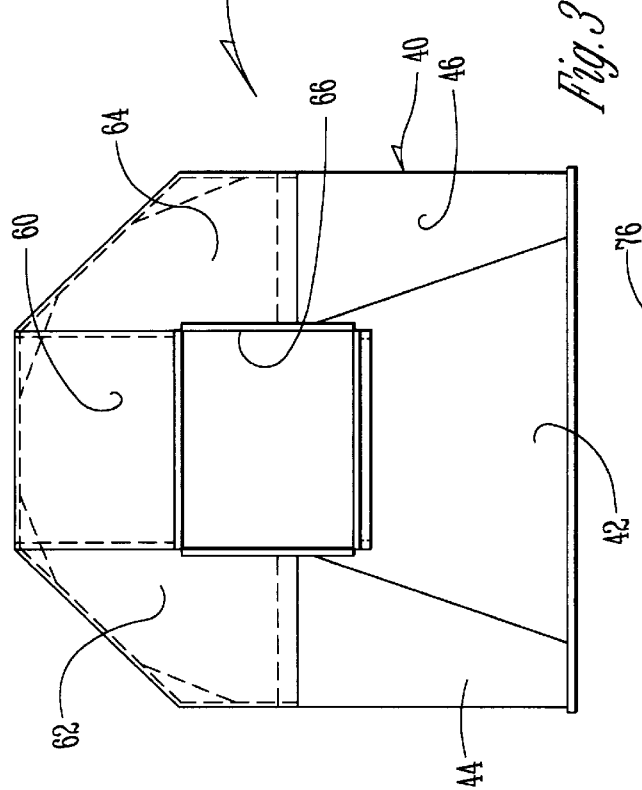

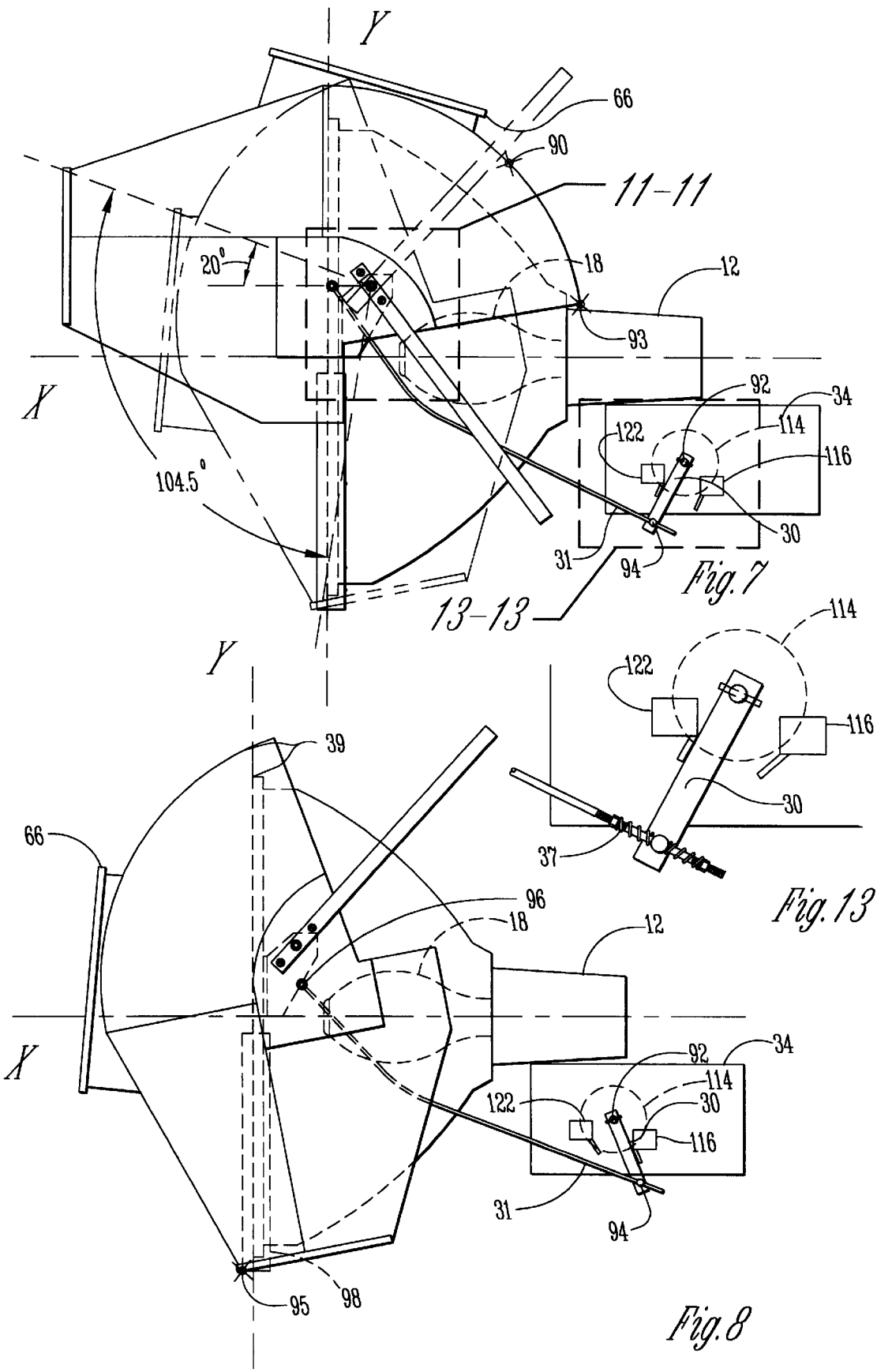

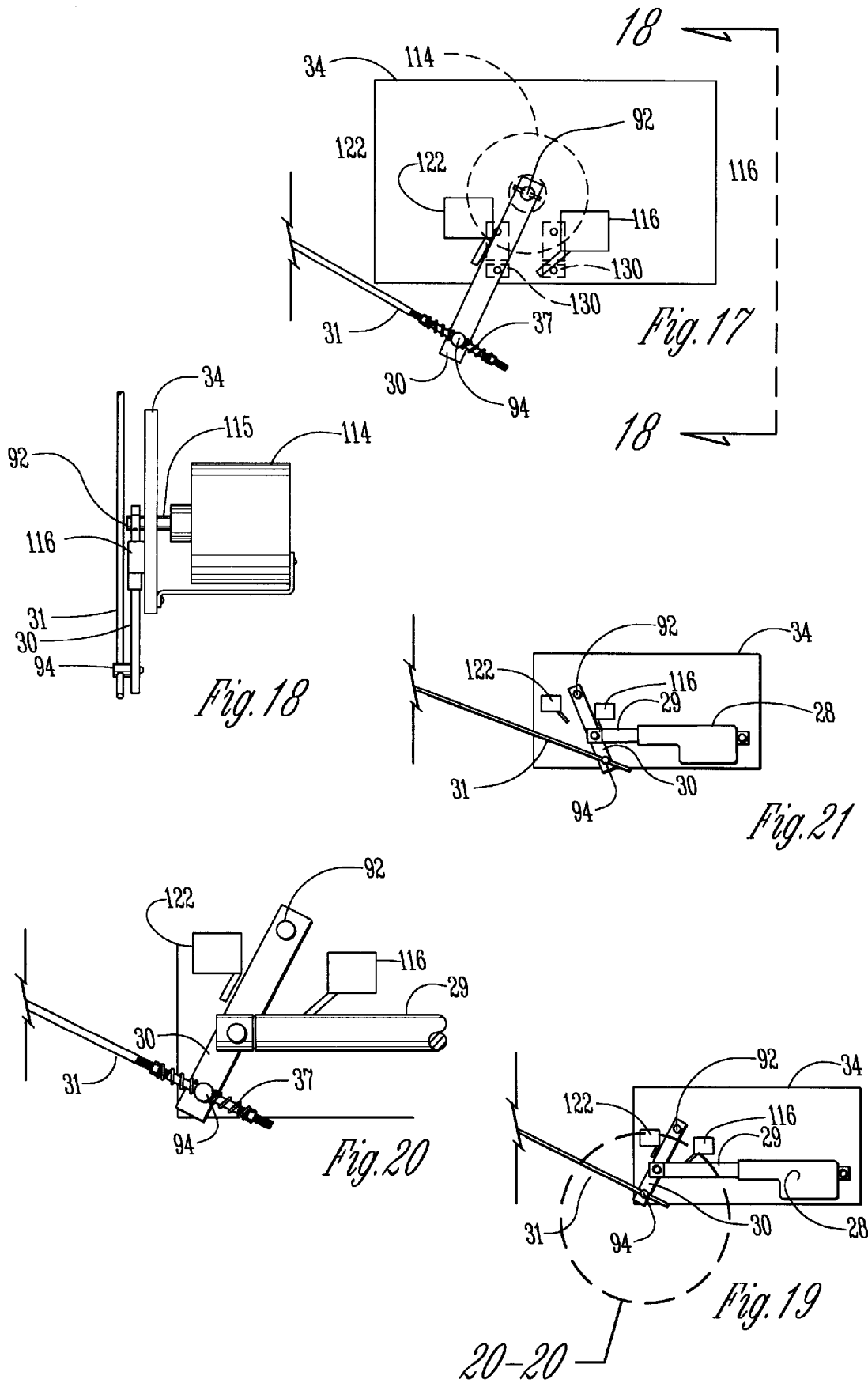

5,860,733

LIGHT FIXTURE WITH CONTROLLABLE LIGHT BLOCK

BACKGROUND OF THE INVENTION

A. Field of the Invention

It is well known in the art that most conventional high intensity discharge (HID) lamps cannot be instantly turned on to full brightness and intensity. Likewise, such lamps cannot be turned off and then quickly turned on again to full intensity. They generally require a re-strike or warm-up period of time.

Incandescent lamps do not have the re-strike problem. Special types of arc lamps, called instant re-strike arc lamps, are available but they are very expensive. Additionally, instant re-strike arc lamps do turn on quickly after they have been turned off, however, if shut off for more than a few minutes, they may re-light at a different temperature or color than what is preferred or needed.

HID lamps are desirable for many uses because the type (color, intensity) of output and the economy of such lamps. This is specially true for lighting of large areas where the light must be controlled and concentrated for projection over substantial distances.

The re-strike problem, as previously stated, is widely recognized in the art. Attempts have been made to deal with that situation and allow relatively quick on/off control. One such attempt utilizes a dimming circuitry to reduce the current to the arc lamp. This reduces the brightness or intensity but does not extinguish the light so complete darkness cannot be achieved.

Attempts have also been made to leave the light at full power but to block the light. Primary problems with this approach include the heat buildup that occurs when blocking such high intensity lights, and difficulty in sealing off the light to achieve total blockage of light.

Symmetrical reflectors (hereafter also sometimes called bowl-shaped or spherical reflectors) produced from surfaces of revolution are an economical, effective choice for high efficiency, controlled concentrated beams over long distances. Trough reflectors or other non-symmetrical shapes are sometimes used for these purposes, but most times they utilize housings, and several support or enclosure pieces for structural support. Their make-up is therefore more complex and expensive than symmetrical reflectors, which can both perform reflecting functions and support such things as a lens without additional framework or housings.

Substantial difficulties face one who wishes to attempt to simply block light from such a fixture. No method or structure is known to adequately do so.

Some of the problems are:

1. Strength problems—symmetrical reflectors are generally made of relatively thin metal such as aluminum and cannot bear too much weight or stress.

2. Light sealing—it is difficult to place a block that can be moved in front of the lamp and effectively seal all light emanating from the lamp when on full power.

3. Heat—once closed or even partially closed, the heat buildup is a concern for the structural integrity of the reflector and mounting components, as well as the structure blocking the lamp and the lamp itself. Any significant rise in temperature at or near the lamp may affect performance or even the ability for operation of the lamp.

4. Weight—along with the strength problem, the additional weight of structure to block the lamp is a concern.

5. Complexity—because most lighting applications use numerous fixtures, cost is a high concern as well as the complexity of the structure for reliability of operation and longevity.

Other concerns facing one who desires to achieve an on/off fixture include the flexibility to have some sort of light control in the form of spill or glare control and the ability to produce special effects, for example, different color outputs, strobe affect, and other theatrical type lighting effects.

There is therefore a real need in the art for a lighting fixture that uses a spherical reflector and an HID lamp that has the re-strike problem, but which can quickly have its light output completely blocked or unblocked.

It is therefore a principle object of the present invention to provide a lighting fixture with a controllable light block that solves or improves over the problems and deficiencies in the art.

Another object of the present invention is to provide an apparatus as above described which can completely block light output from the fixture on command.

Another object of the present invention is to allow block off of light from the fixture immediately on command.

Another object of the present invention is to allow light from the fixture to be blocked for indefinite continuous periods of time without danger of detrimental heat buildup.

Another object of the present invention is to provide an apparatus having a minimum number of moving parts and which is not complex in structure.

Another object of the present invention is to have the flexibility for special light control and special lighting effects.

These and other objects, features, and advantages of the present invention will become more apparent with reference to the accompanying specification and claims.

SUMMARY OF THE INVENTION

The invention includes a light fixture with a controllable light block. The light fixture includes a symmetrical reflector and HID lamp that is mounted to a mounting structure. A cover member is moveable between an unblocked and blocked position relative to the reflector and arc lamp output. The apparatus is configured so that the cover can be in the blocked position for an unlimited amount of time without of heat to a detrimental level.

Optionally the apparatus can include light control and special effect lighting features.

BRIEF DESCRIPTION OF THE DRAWINGS

FIG. 1 is a perspective view of apparatus according to a preferred embodiment of the invention mounted on a cross-arm with the light block or cover member in an unblocked position (the right-most fixture) and the same apparatus in a blocked position (left-most fixture).

FIG. 2 is a diagrammatical depiction of use of a plurality of fixtures in a sports arena, some or all of which could be the fixtures of FIG. 1.

FIG. 3 is a top plan view of the cover member for the fixture of FIGS. 1 and 2 after it has been formed and assembled.

FIG. 4 is a side elevational view of the cover member after it has been formed and assembled.

FIG. 5 is a front elevational view of the cover member after it has been formed and assembled.

FIG. 6 is a back elevational view of the cover member after it has been formed and assembled.

FIG. 7 is a side elevational view of the apparatus of FIG. 1 showing the cover member in an unblocked position in solid lines, and a blocked position in broken lines.

FIG. 8 is similar to FIG. 7 but shows the cover member in a fully blocking position in solid lines.

FIG. 11 is an enlarged view of the portion indicated by line 11—11 in FIG. 7.

FIG. 12 is an enlarged view of the portion indicated by line 12—12 in FIG. 9.

FIG. 13 is an enlarged view of the portion indicated by line 13—13 in FIG. 7.

FIG. 14 is an enlarged isolated view of an alternative plate that could be positioned over the rectangular opening in the cover member, the plate in FIG. 14 including a colored filter or gel substance.

FIG. 15 is an enlarged perspective view of an alternative plate that could be used over the rectangular opening in the cover member, the plate in FIG. 15 having shutters which can be opened to selectively block or allow passage of light through the rectangular opening in the cover member.

FIG. 17 is an enlarged elevational view taken generally of the area indicated by line 17—17 of FIG. 1.

FIG. 18 is an elevational view taken along line 18—18 of FIG. 17.

FIG. 19 is a partial elevational view similar to FIG. 17 but illustrating an alternative actuator for closing the hood of a fixture like those shown in FIG. 1.

FIG. 20 is an enlarged view of the portion of FIG. 19 shown at line 20—20.

FIG. 21 is similar to FIG. 19 but shows the actuator in a position where the cover would be in the closed position, in comparison to FIG. 19 which shows the actuator in associated structure when the cover is in an open position.

DETAILED DESCRIPTION OF THE PREFERRED EMBODIMENT

Figure 9:
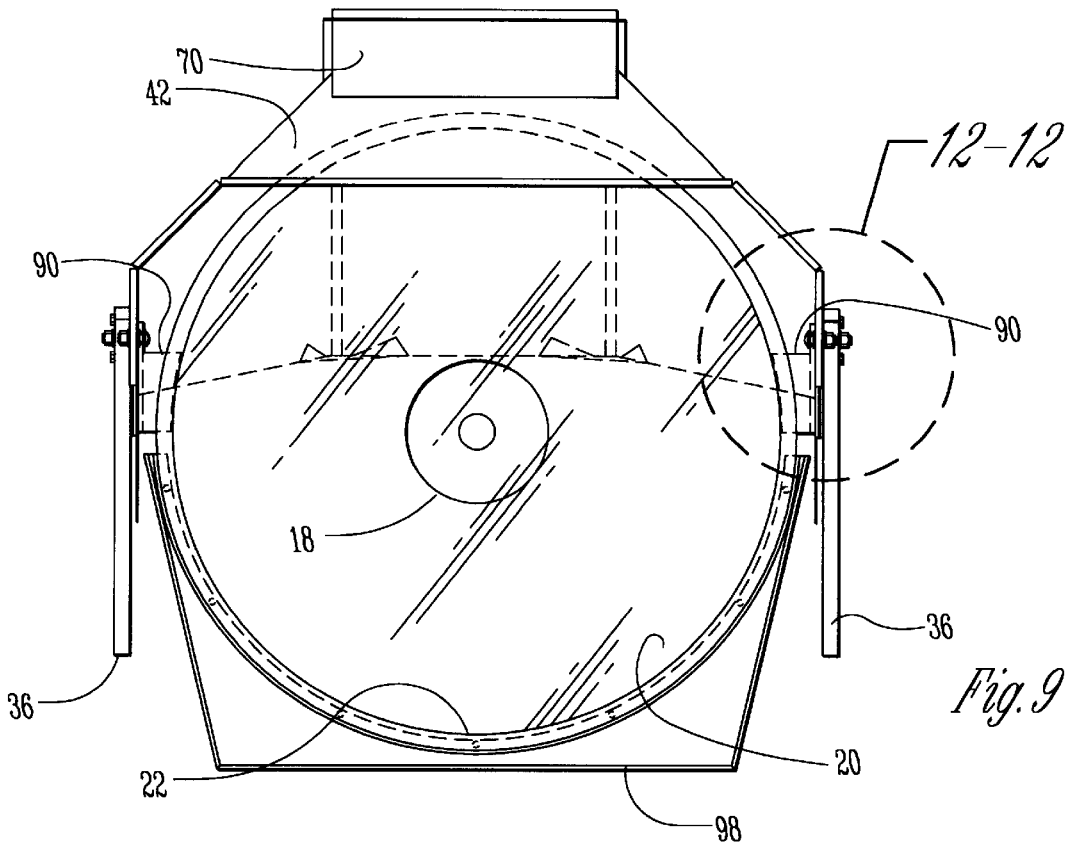
FIG. 9 is a front elevational view of the apparatus of FIG. 1 showing the cover member in an unblocked position.

To assist in a better understanding of the invention, a preferred embodiment of the invention will now be described in detail. The appended figures will be frequently referenced and reference numerals or letters will be used to identify certain parts and locations in the figures. The same reference numerals/letters will be used to identify the same parts or locations in the figures unless otherwise indicated.

A. Overview

FIG. 1 illustrates two fixtures 10, each of which includes a mounting member 12 and knuckle 11 which is connectable to a cross-arm 14 or other support structure capable of supporting the fixture. A reflector 16 is mounted to mounting member 12 at its back portion. In this embodiment, mounting member 12 also includes a receptacle for the support and electrical connection of a lamp 18 (see example at 18 in FIG. 8) that extends through an aperture in the back of reflector 16 and into mounting member 12. A lens 20 covers opening 22 of reflector 16 to essentially enclose lamp 18 in the interior of reflector 16. Reflector 16 has an interior surface which is reflective. The precise reflecting characteristics surface can vary according to need.

What has been described so far is a lighting fixture such as commonly used for sports field lighting or large area lighting where a plurality of such fixtures are placed at elevated positions of substantial distance away from the actual playing field or target area 100 (see for example FIG. 2). Lamp 18 can be, for example, a high power, high intensity arc lamp. Examples are 1000 to 1500 watt metal halide arc lamps. Other HID lamps are also possible.

It is to be understood, however, that in the preferred embodiment, lamp 18 has a characteristic that requires a warm-up period when electrical power is applied to lamp 18. The period is several seconds to even minutes until it generates light at close to or at full intensity. The nature of such lamps is such that they will not come to full intensity immediately after electrical power is supplied to them, such as is well known in the art. Similarly, if they are operating at full power and full intensity after an initial warm-up period, if electrical power is taken away from the lamp (including if a substantial drop in electrical power occurs), the lamp will extinguish and an additional warm-up or re-strike period occurs when full power is again applied. Therefore, one cannot instantaneously or even quickly turn the lamps on and off by controlling electrical power to such lamps, and close to full or full intensity cannot be immediately or quickly produced.

Therefore, as can be seen in FIG. 1, a cover member 26 is mounted on reflector 16. It has a shape, size, and configuration, so that in the position shown in FIG. 1 with regard to the right-hand fixture 10 (a first or unblocked position), cover member 26 does not block lens 20 and opening 22 to reflector 16 (see also FIGS. 7 and 9). Essentially the full light output from fixture 10 can thus be utilized for projection to a field or target area. As will be discussed further, the preferred embodiment of cover member 26 has the additional feature of functioning as a reflector extension or visor, which can assist in light control from fixture 10. For example, cover member 26 can serve to block light which otherwise might project upwardly and outwardly from fixture 10 and be unusable as spill light outside of the target area, or cause glare or other light pollution. In an arena, it is detrimental to allow light to project onto the video boards or scoreboards that are suspended above the arena floor.

It may function additionally to redirect otherwise unusable or detrimental light, at least in part to the target area, if appropriately configured to make part or all of the inner surface 27 of cover 26 reflective. This is particularly true where fixture 10 is elevated and tilted below horizontal to the target area.

Figure 10:
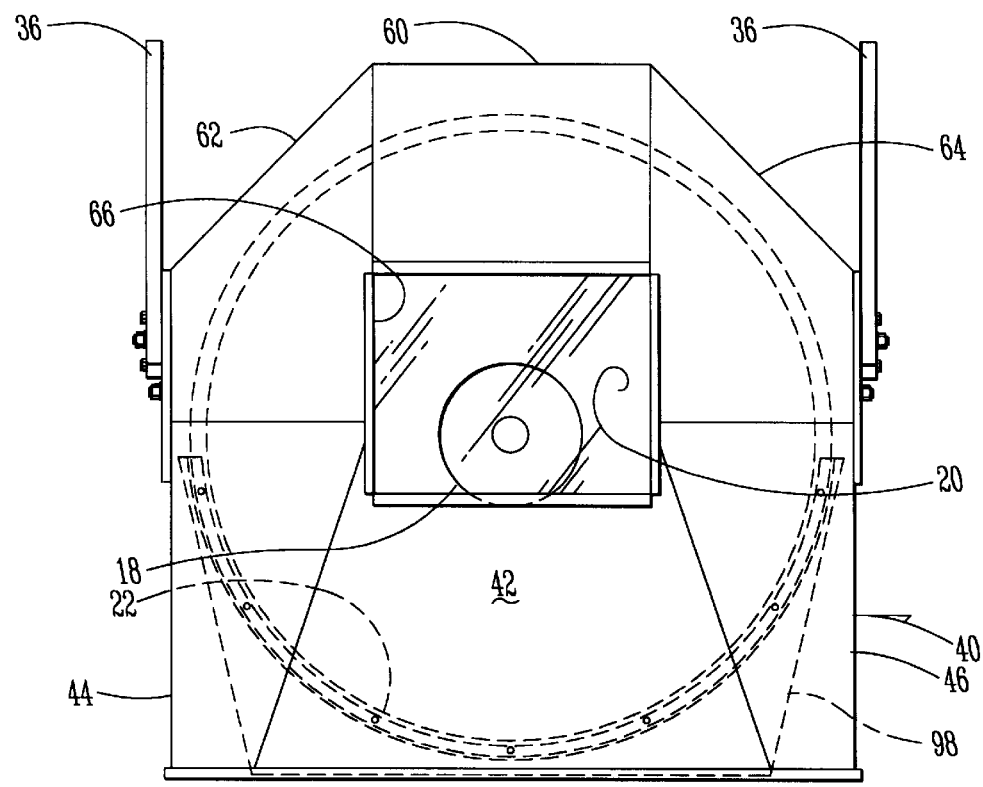
FIG. 10 is similar to FIG. 9 but shows the cover member in a blocking position and with the plate over the rectangular opening in the cover member removed.

With reference to the left-hand fixture 10 in FIG. 1, cover member 26 is shown in a second or blocking position where cover member 26 completely covers lens 20 and opening 22 (see also FIGS. 8 and 10). Cover member 26 pivots with respect to reflector 16 from the first position (the right-hand fixture of FIG. 1) to the second position (the left-hand fixture of FIG. 1). As will be described in more detail later, the pivoting movement of cover member 26 can be controlled remotely and according to desire by an electromechanical actuator (for example, a 12VDC gear motor 114—see also FIGS. 17 and 18) which moves control arms 30 and 31 connected between the actuator and cover member 26. Actuator 114 is either connected to a remote control device by hardwiring 33 or other signal communication apparatus such as, for example, radio or infrared remote controls. Alternatively, other actuators can be used. For example an electrometrical linear actuator can be used in place of the electric motor. An example is an Electrak 1 24 VDC S24-09A4-02 with fixed limit switches (load capacity 25 lbs.).

FIGS. 17 and 18 show that actuator 114 is mounted on support plate 34 (³⁄₁₆" aluminum—see also FIG. 1) which is connected to mounting bar 35 (2×2×³⁄₁₆" aluminum angle bracket) that in turn is affixed to mounting member 12 by bolts, screws, welding, or other methods. Note also balance bars 36 connected to reflector 16. They serve as counter weights to assist cover member 26 moving from the second to the first position.

Still further, it is to be understood that the exterior of reflector 16 can be painted flat black. All or part of the interior surface 27 and all or part of the exterior 38 of cover member 26 can be painted flat black. Cover member 26 and reflector 16 are both made of thermal conductive for rapid transfer of heat. In the preferred embodiment both are made of thin sheets of aluminum (0.020" thick aluminum 3000). Although the aluminum is a good heat conductor, painting the interior and exterior of cover member 26 flat black, and the exterior of reflector 16 flat black, causes heat to be absorbed by the interior of cover member 26, conducted to the exterior of cover member 26, and radiated. Heat conducted to the exterior of reflector 16 is also radiated. Heat is not reflected back into reflector 16.

Furthermore, as will be described later below, when cover member 26 is in the second or blocking position, (see FIG. 8), its rounded shape leaves a substantial volume of space between it and the lens 20 of reflector 16. A gap or space 39 (see FIG. 8) is left at the top of fixture 10 between cover member 26 and reflector 16 so that heat buildup caused by cover member 26 blocking the light output from fixture 10, is prevented from detrimentally affecting fixture 10 because of the chimney affect that allows heat to rise and escape through gap 39. The relatively large surface areas of reflector 16 and cover member 26, and the relatively large volume of space between lens 20 and cover member 26, cooperate to handle heat generated by the fixture 10, even when cover member 26 is completely closed for extended periods of time and lamp 18 is operated at full intensity. Heat build-up has been found to be limited to only a few percent rise, which is not detrimental to fixture 10 or lamp 18.

FIGS. 3–6 show in detail the structure of cover member 26. It is to be understood that other shapes, configurations, and sizes are possible. Cover panel 40 comprises the major part of cover member 26. It includes a center flat portion 42, flat opposite panels 44 and 46, and flat side pieces 48 and 50 (see FIGS. 5 and 6). Pieces 48 and 50 include rearward pivot extensions 52 and 54 (only 52 is shown in FIG. 4). Each piece 48 and 50 includes a pivot aperture 84 which defines the pivot point on both sides of cover member 26.

The shape and configuration of cover panel 40 also allows it to function as a light controlling reflector extension or visor in first position as shown in FIG. 1.

Cover member 26 also includes a center rear panel 60, and side cover panels 62 and 64; all of which cooperate with cover panel 40 to complete the basic hood or cover structure that allows a complete blockage of lens 20 and opening 22 to reflector 16 when cover 26 is in the second position.

As can also be seen, an aperture 66 is built into the top center of cover member 26 for specialized lighting purposes or effects. To provide the essentially rectangular or square and planar frame that exists at the top of what is being called aperture 66, a knockout front panel 70, and knockout side panels 72 and 74, extend upwardly from cover panel 40 and/or center rear panel 60 to form a rectangular planar frame 76. A removeable cover plate 78 is shown in place in FIGS. 3–5. It can be attached by screws 71 or other structure(s) or method(s).

It is to be understood that the separate pieces of cover member 26 are assembled and connected to one another by appropriately shaping thermal conductive aluminum sheet metal and then, as illustrated by the dashed lines in FIGS. 3–6, margins along adjoining edges of the pieces are bent and then folded down to allow the pieces to grip or inter lock one another. The method shown is sometimes called hem and rivet construction and then sealed with silicone or equivalent. Alternatively, the pieces could be seamed together. Other methods are possible.

All joints and corners are sealed to be light tight with a sealant that in the preferred embodiment must withstand 600° Fahrenheit. An example of such a sealant is silicone. All material in the hood must withstand 600° Fahrenheit although it does not reach that temperature. The cover member 26 or hood is coated flat black outside with no sheen.

In the preferred embodiment, cover member 26 is approximately 24" wide, 24.7" in depth, and 17.2" in height. Reflector is approximately 23" in diameter at opening 22 and 10.5" deep.

It is to be understood, of course, that different materials and configurations of cover member 26 could be used, including different members to fuse or connect together the multi-part structures. Cover member 26 could also be made of fewer parts or of a single piece of material.

As can be seen in FIG. 4, a pivot reinforcing plate 80, of essentially similar shape as pivot extensions 52 and 54 is secured in position over both pieces 52 and 54. Plate 80 is made out of 0.080" thick aluminum (3000). It includes four holes. Hole 82 receives a connection for the outer end of the control arm 31. Hole 84 is aligned with hole 84 in cover member 26 and receives a pivot pin 85 (see FIG. 11) to allow pivoting of cover member 26. Holes 86 and 87 allow mounting of balance bars 36 (see FIG. 11) by bolts, screws, or other members. Other mounting methods are possible.

FIGS. 7–12 illustrate in more detail the operation of cover member 26 relative to reflector 16 and lamp 18.

As can be seen, FIGS. 7 and 9 show cover member 26 in the first or unblocked position. Cover panel 40, including its downwardly extending flat side pieces 48 and 50, serve to control light that would otherwise project upwardly and outwardly out of fixture 10. Otherwise, lens 20 and opening 22 to reflector 16 are unblocked allowing the light output of fixture 10 to project. Note the position of aperture 66. It is up and out of the way. Point 93 is a fail safe stop for the rotation of cover member 26; which would run into mounting member 12 and could not continue to pivot in the direction of mounting member 12 and thus defines the farthest open position for cover member 26.

As can be seen, the pivot point of pivot pin 85 is approximately 1.8" rearward from the plane defining the opening 22 of reflector 16 (see line Y) and is approximately 2.7" above the plane which divides the top and bottom halves of fixture 10 in FIG. 7 (see line X). It can furthermore be seen that the entire range of pivot of cover member 26 is 104.5°. The off-center rotation point allows cover member 26 to cover the entire light source and when it returns, stay above knuckle 11.

By referring to FIG. 8, point 95, the lower edge of reflector 16 at opening 22, will limit the downward pivoting of cover member 26 in the farthest second position. Cover member 26 will rotate into and around blocking member 98 (which mates with the interior profile of cover member 26) to block light which reflects from the interior of cover member 26 (when closed) and which might otherwise project backwards through any spaces between cover 26 and reflector 16. Blocking member 98 is made out of 0.030" aluminum (3000) sheet with a high temperature silicone material of 40 diameter extending ¾" in front of the aluminum. The silicone cushions and seals the cover member 26, like a gasket, when it closes. Note, however, that when cover member 26 is in the closed or second position, aperture 66 is substantially directly aligned in front of and centered on opening 22 of reflector 16.

FIGS. 9 and 10 show, from a front elevational standpoint, a view of fixture 10. They further show how the second position of cover member 26 completely blocks opening 22 to reflector 16. They also show how aperture 66 would be substantially centered in opening 22 of reflector 16 when cover member 26 is in the second position.

FIGS. 11 and 12, show in more detail the attachment of cover member 26 to reflector 16. A bracket 90, which is fixed to reflector 16 by bolts (not shown) or other means or methods, extends outwardly from the perimeter of reflector 16 (see FIG. 12) and then has a bent portion that is generally parallel to the side of reflector 16 right at opening 22. Pivot pin 85 extends through aperture 84 which extends in alignment through bracket 90 and cover member 26. This configuration exists on both lateral opposite sides of fixture 10. Therefore, reflector 16 itself basically supports cover member 26 and requires no further substantial framework or structure to do so. The primary reason this can take place is that cover member 26 is itself made of metal material which is light weight. Nylon bushings, bearings, and washers can be used to assist in smooth pivoting of cover member 26.

FIGS. 1, 7, 8, 13, 17 and 18 illustrate how motor 114 has a rotating axle 115 that extends through plate 34 and is connected to one end of first control arm 30. This connection can be a rollpin connection (see FIG. 17). It could also be keyed. A screw or bolt can be threaded into the end of axle 115 to hold control arm 30 against axle 115. Axle 115 and control arm 30 could be connected by other methods, such as welding. Second control arm 31 is pivotably attached at pivot pin 94 to the opposite end of first control arm 30, and pivotably attached at pivot pin 96 in aperture 82 of cover member 26. It can be seen in the preferred embodiment that second control arm 31 is bent slightly, and extends under balance bar 36 and in-between reflector 16 and cover member 26 to pivotably attach to pin 96 inside cover member 26. Spring 37 (see FIG. 13) serves to take shock away when cover member reaches either the closed or open positions.

By comparing FIGS. 7 and 8, it can be seen that when motor 114 rotates axle 115 clockwise (as to the view direction of FIGS. 7 and 8), cover member 26 moves to the first or unblocked position (FIG. 7). Rotation of axle 115 counter-clockwise pivots cover member 26 down to the blocking position (FIG. 8). It is to be understood, that by appropriate operation of motor 114, cover member 26 can be moved to any intermediate position between the first and second positions if desired.

In the preferred embodiment, motor 114 is a 12 VDC gear motor (Dayton 47835) and is rigidly mounted to plate 34. It operates on 12 VDC electrical power and as diagrammatically illustrated FIG. 16, an appropriate power supply and control circuit could be utilized to remotely operate a motor 114 for each fixture 10. Alternatively, other types of actuators, including hydraulic, pneumatic, electric motors, etc. could be utilized. The configuration regarding how to transfer motion of actuator 28 into pivoting action of control member 26 could also vary.

Figure 16:
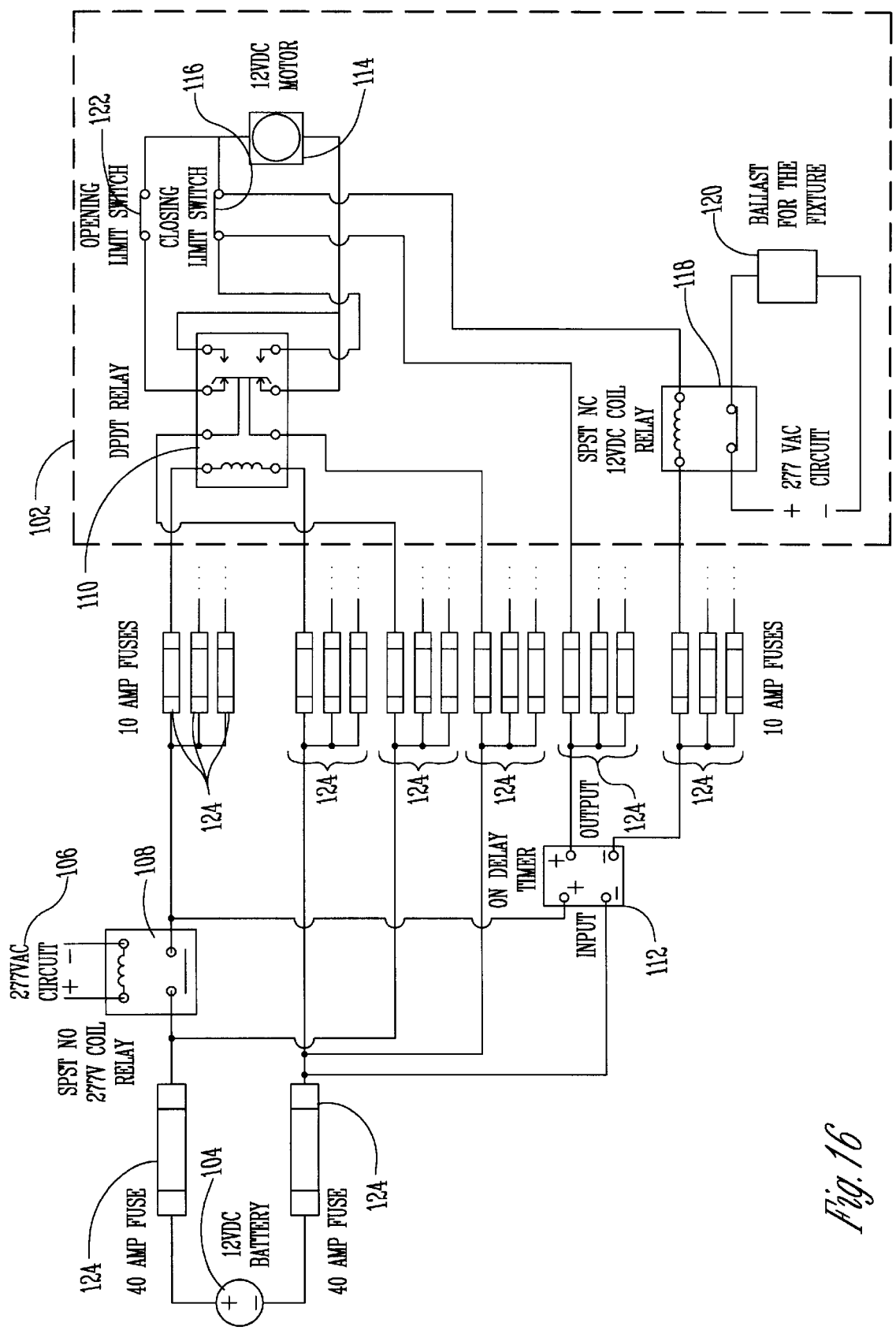
FIG. 16 is a schematic diagram of an embodiment of control circuitry for the present invention.

FIG. 16 is a schematic diagram of the control circuit of the present invention. The control circuit in FIG. 16 shows an embodiment using a DC motor as the actuator of the invention. The portion of the circuit enclosed by the dashed line 102 is typical for each light fixture. Multiple sets of fuses 124 are shown to indicate how other fixtures 10 are connected to the circuit. Typical arena lighting can involve a hundred or more fixtures 10. A 40 amp 12 volt DC battery 104 (Dynasty GC 12400B) is used to power the system at all times. A 2 amp 12 volt DC battery charger (Dynasty GRC12200CDM—not shown) is used to recharge the battery when needed.

The operator commands, through an existing control console, when the cover member 26 should be closed. This is accomplished by turning on a 277 volt AC circuit 106. The circuit 106 is connected to a single pole, single throw, normally open coil relay 108 (Square D, 8501C06V04, 277V coil, 30 amp). When the circuit 106 is on, the coil of the relay 108 is energized, closing the contacts of relay 108 which allows 12 volts from the battery 104 to energize the coils of a double pole, double throw, relay 110 (Square D, 8501CD016V12, 12 VDC coil, 30 amp). When the contacts of the relay 108 are closed, the delay-on timer 112 (NCC, TIK-10-466) starts counting. When the coil of relay 110 is energized, 12 volt DC power is supplied to a 12 volt DC motor 114 which acts as the actuator of the invention. The motor 114 causes the cover member 26 to begin to shut. When the cover member 26 reaches the closed position as shown in FIG. 8, a closing limit switch 116 (Dayton 6X2992) will come into contact with the device, breaking the circuit and causing the motor 114 to stop. If the limit switch 116 does not come into contact with the device and the timer 112 has counted five seconds, then the fixture will be extinguished. Note that the five seconds time period can be adjusted. When the timer 112 counts to five seconds, power is applied to a single pole, single throw, normally closed relay 118 (Square D, 8501CDD8V12, normally closed 12 VDC coil, 30 amp). This opens the circuit to the ballast 120 of the fixture causing the fixture to extinguish. The limit switch 116 is normally closed and the contacts of the switch are wired in series with the timer 112 and the relay 118. Therefore, if either of the timer 112 or the limit switch 116 are not true then no power will be applied to the relay 118. True being for the timer that the five seconds have not elapsed after the timer has started to count and for the limit switch that the limit switch has not come into contact with anything.

When an operator commands through the control console that the cover members 26 are to be opened, the 277 volt circuit 106 is turned off which de-energizes the coils of relay 108 eliminating the 12 volts that energizes the coil of relay 110. This also resets the timer 112. When the coil of the relay 110 is de-energized, the motor 114 is energized by 12 volts power from the normal contacts of the relay 110 causing the cover member 26 to begin to open. When the device reaches the open position, the opening limit switch 122 (Dayton 6X2992) will come into contact with the device breaking the circuit and causing the motor 114 to stop.

The control circuit includes a pair of 40 amp fuses 124 (Fusetron FLNR40, Time Delay Class RK5) at the positive and negative terminals of the battery 104. A set of 10 amp fuses 124 (MDA10) are positioned in the circuit as shown in FIG. 16. The fuses are used to protect the wires and the system prior to the individual wires going to the fixtures.

A second timer not shown, but (like timer 112) could be used as a delay-off timer for each motor 114. It allows voltage to motors 114 for five seconds only. If the limit switch does not turn motor 114 off, this second timer will shut off motor 114 so it will not grind away or take up power.

FIG. 2 diagrammatically depicts an example of a sports arena and a plurality of fixtures 10 relative to that arena. Fixtures 10 are supported on cross-arms that are in turn supported from super structure in the arena, or alternatively, some other elevating or suspending structure. It is to be understood that the invention can be useful in a variety of other situations, for example, theaters and other large area lighting applications.

By utilizing fixtures 10, the lamps could all come up to near or at full intensity after an initial warm-up period. If cover members 26 or in the second or blocking position, lamps 18 could be warmed-up to close to or full intensity without any light reaching the target area (the entire arena could essentially be kept dark assuming the absence of other light). Otherwise, cover member 26 could be in the first or unblocked position and allow lamps 18 to warm-up. Once warmed-up, by remote control, signals could be sent to all of fixtures 10 to simultaneously darken the arena by pivoting of cover members 26 quite quickly to the second or blocking position. Because the structure of fixtures 10 allows cover members 26 to be put in the blocking position while leaving the lights at full or substantial intensity, even for substantial periods of time because of their heat transfer and heat handling capabilities, the arena can be almost instantaneously darkened and just as quickly almost instantaneously full light can be brought back.

In the preferred embodiment, the actuators allow the full blockage or substantial un-blockage in a matter of 1.2 seconds or so.

It is easily understood, that other than complete darkening of the arena can be accomplished. For example, selected fixtures 10 can be blocked or unblocked according to the desire to create partial illumination. It is also conceivable that sequential blocking or un-blocking of different fixtures can occur to create effects such as running an area of illumination around the arena. Other control of a plurality of such fixtures 10 is possible.

Additionally, by utilizing shutters or colored filters in aperture 66 instead of a opaque plate, such as shown in FIG. 1, special lighting effects can occur even when cover member 26 is in the second or blocking position. For example, the use of a quick open and close shutter (for example, see FIG. 15), again by remote actuation, could give almost instantaneous on/off lighting effects but without the full light output of fixture 10. An electric solenoid 83 and moveable arm 135 could be used to open or close the shutter vanes 79 (pivotable on frame 81) from the center control panel. Remotely controllable flip-back covers, or camera-type aperture shutters could also be used. Other methods are possible. Still further, the use of colored filters could allow colored lighting to be quickly substituted for full lighting. It is even contemplated that by utilizing red, blue, and green filters in various fixtures 10, and then selecting the proportion of red, blue, and green filters used in any given moment could allow a spectrum of colors to be created. As will be appreciated, other special lighting effects are contemplated.

It will be appreciated if the present pre-described preferred embodiment is but one form of the invention can take. It is not intended nor does it limit the scope of the invention, which is defined by the accompanying claims. Changes or modifications within the skill of those skilled in the art are contemplated within the invention defined by the claims.

We claim:

1. A high intensity lighting fixture, including a high intensity light source that requires a warm-up period to come to close to full or full intensity, with quick on/off control while maintaining substantial light intensity from the light source once the warm-up period is completed, comprising:
    a mounting member;
    the high intensity light source mounted to the mounting member;
    a reflector mounted to the mounting member;
    the reflector defining an opening through which light from the light source is directed externally of the fixture;
    a cover member mounted to the fixture; and
    the cover member being moveable between a first position and a second position which blocks and encloses substantially all of the opening of the reflector at or near the opening of the reflector, the cover member including an aperture that is closeable.

2. The fixture of claim 1 wherein the light source is a high intensity arc lamp.

3. The fixture of claim 1 wherein the reflector is symmetrical about an axis, comprised of one or more surfaces of revolution.

4. The fixture of claim 1 wherein a largest diameter of the reflector is on the order of at least a foot.

5. The fixture of claim 1 further including a pivot bracket attached to the reflector and a pivot connection on the cover member.

6. The fixture of claim 1 wherein the cover member is pivotably attached to at least one of the reflector and the mounting member.

7. The fixture of claim 1 wherein the cover member has interior and exterior surfaces, and the interior surface absorbs heat and the exterior surface radiates heat.

8. The fixture of claim 1 wherein the reflector has an exterior heat radiating surface.

9. The fixture of claim 1 wherein the reflector is thermally conductive to promote the transfer of heat from the light source.

10. The fixture of claim 1 wherein the cover member has thermal conductive walls to promote the transfer of heat from the light source.

11. The fixture of claim 1 further comprising a small gap defined by the cover member and the reflector when the cover member is in the second position to allow the escape of heat.

12. The fixture of claim 11 wherein the gap is at or near an upper portion of the fixture.

13. The fixture of claim 1 wherein the aperture is generally alignable with the opening in the reflector when the cover member is substantially in the second position.

14. The fixture of claim 13 wherein the aperture is filled by at least one of a set comprising an opaque member, a controllable shutter member, a colored filter member, and a gel filter member.

15. The fixture of claim 1 wherein the cover member controls projection of light when in the first position by being positioned in the light from the light source.

16. A lighting fixture comprising:
    a reflector of over one foot largest diameter having a relatively thin wall defining an interior reflecting surface and an exterior surface, connection members to mount the reflector to a mounting member, and a lens covering an opening to the interior reflecting surface;
    a high intensity discharge lamp enclosed within the reflector, the lamp having a warm-up period and being of high intensity and high power, the reflector having a relatively large surface area in comparison to the lamp;
    a cover member pivotably mounted to the reflector and having a size and shape that allow it to completely block the opening and lens of the reflector and to pivot to un-block substantially all of the opening and lens of the reflector; and the cover member having a relatively large surface area in comparison to the lamp and, when blocking the opening and lens of the reflector, defining a volume of space of substantial amount so that surface area of the reflector and cover member and the volume of space preventing detrimental levels of heat build-up when the cover member completely blocks the opening, even if the lamp is maintained at full intensity.

17. The fixture of claim 16 wherein the reflector is symmetrical about an axis, comprised of one or more surfaces of revolution.

18. The fixture of claim 16 wherein the cover member has interior and exterior surfaces, and the interior surface absorbs heat and the exterior surface radiates heat.

19. The fixture of claim 16 wherein the reflector has an exterior heat radiating surface.

20. The fixture of claim 16 wherein the reflector is thermally conductive to promote the transfer of heat from the lamp.

21. The fixture of claim 16 wherein the cover member has thermal conductive walls to promote the transfer of heat from the lamp.

22. The fixture of claim 16 further comprising a gap defined by the cover member and the reflector when the cover member is blocking the opening to allow the escape of heat.

23. The fixture of claim 16 wherein the gap is at or near an upper portion of the fixture.

24. The fixture of claim 16 further comprising an aperture in the cover member generally alignable with the opening in the reflector when the cover member is substantially blocking the opening.

25. The fixture of claim 24 wherein the aperture is filled by at least one of a set comprising an opaque member, a controllable shutter member, a colored filter member, and a gel filter member.

26. The fixture of claim 16 wherein the cover member controls projection of light when pivoted to un-block at least most of the opening and lens of the reflector by being positioned in the light from the lamp.

27. The fixture of claim 26 wherein the cover member functions as a reflector extension visor when pivoted to un-block at least most of the opening and lens of the reflector.

28. The fixture of claim 26 wherein the cover member includes an inner surface portion which is reflective.

* * * * *